Figure 1:
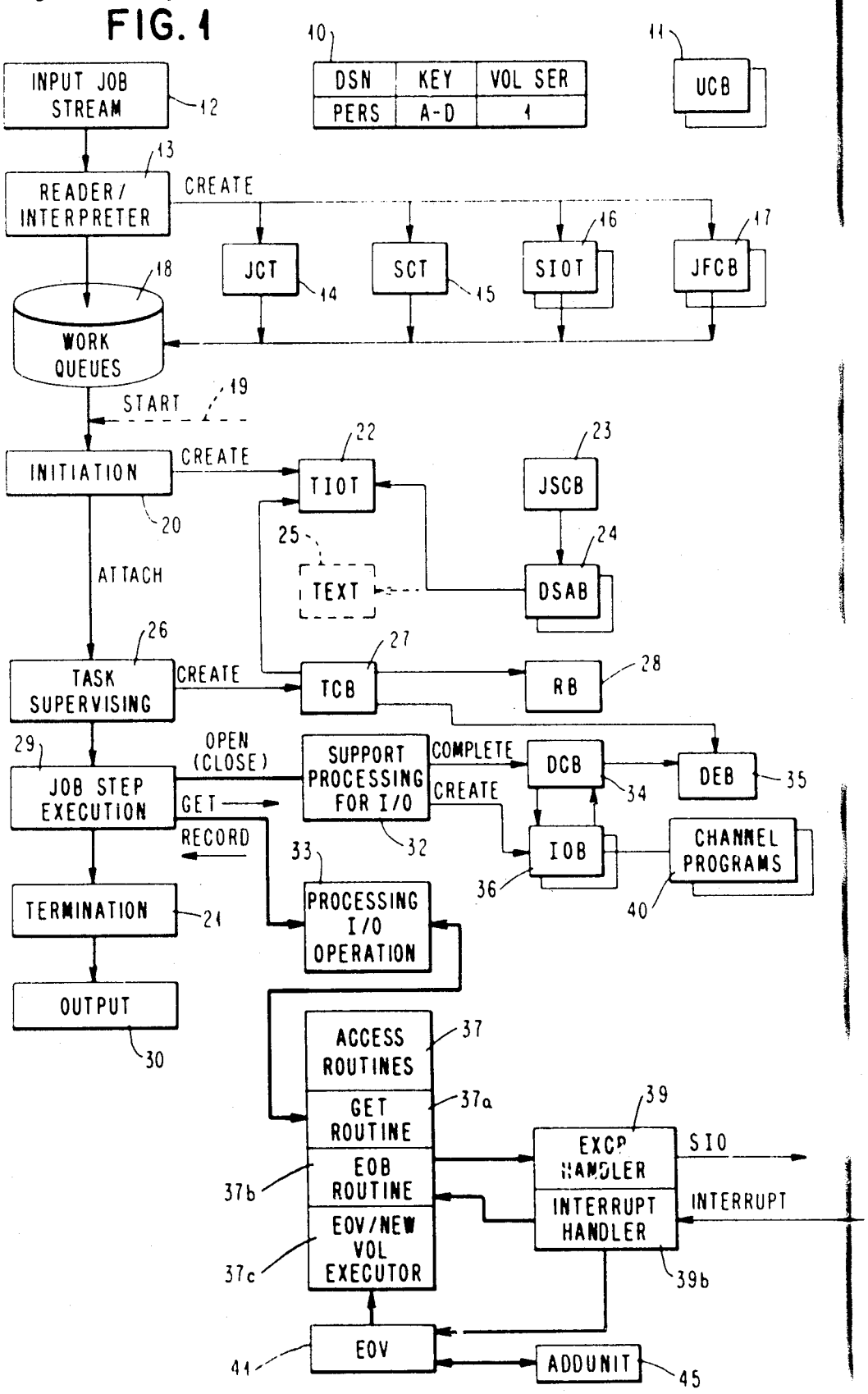
Figure 2:
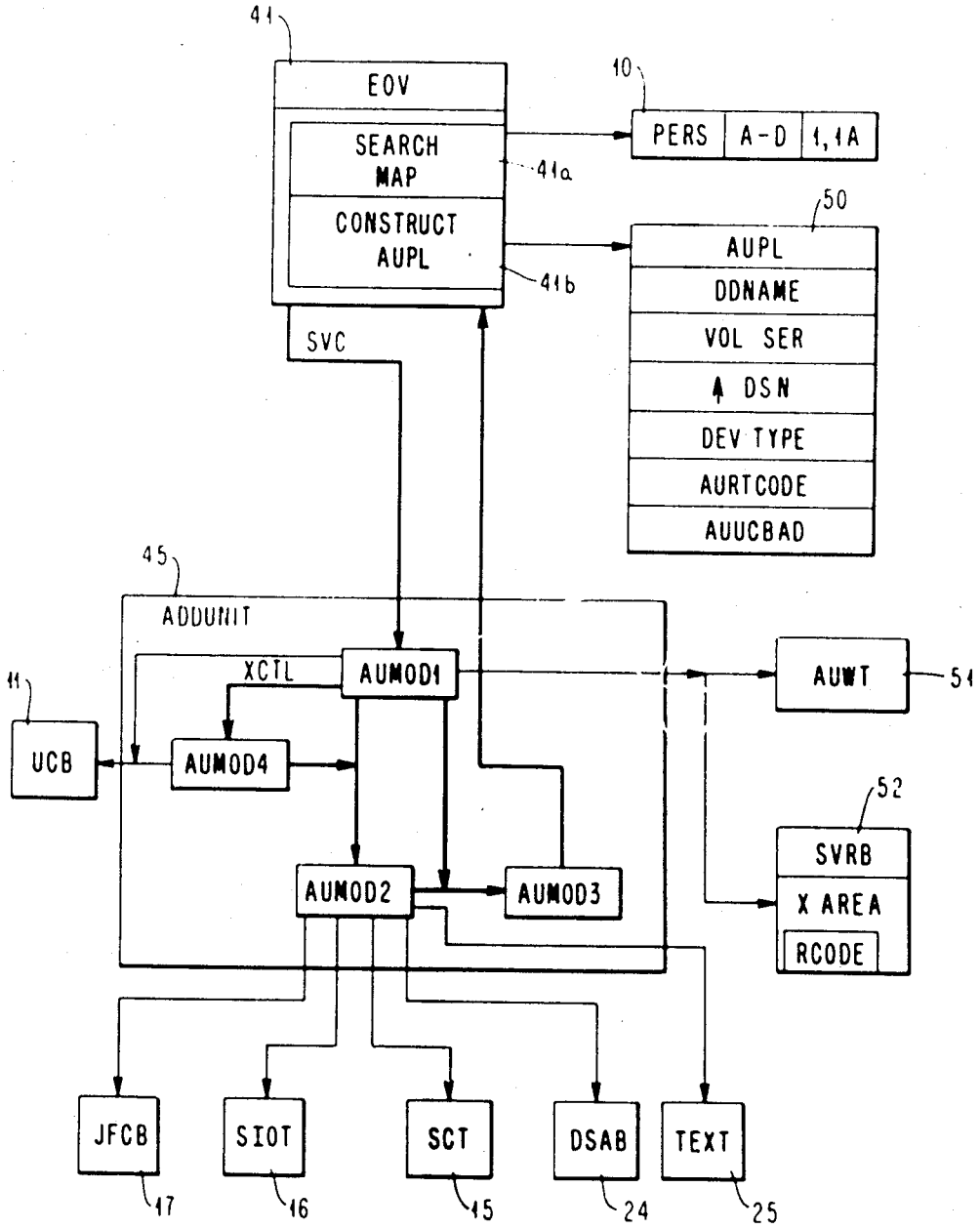
Figure 3A:
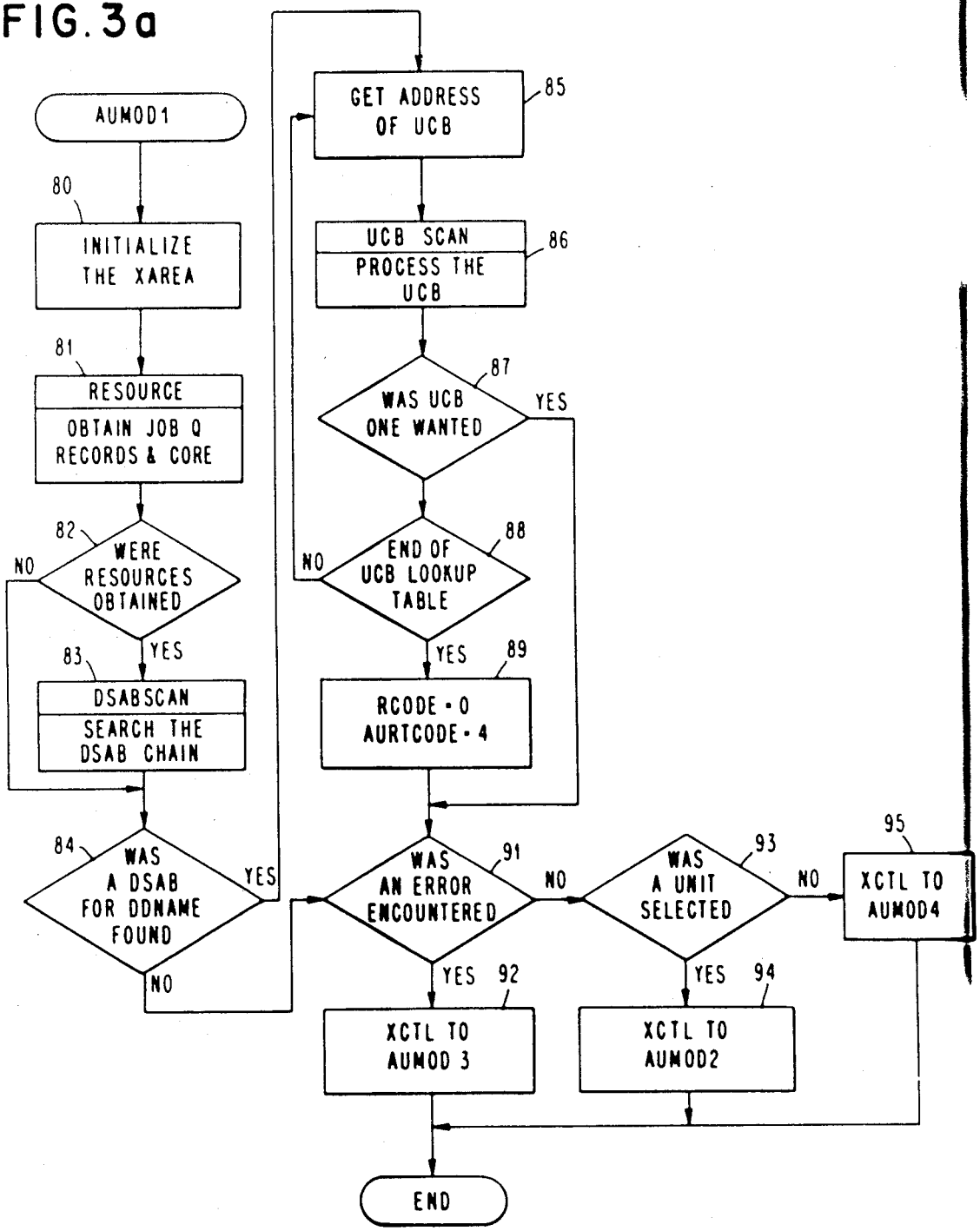
Figure 3B:
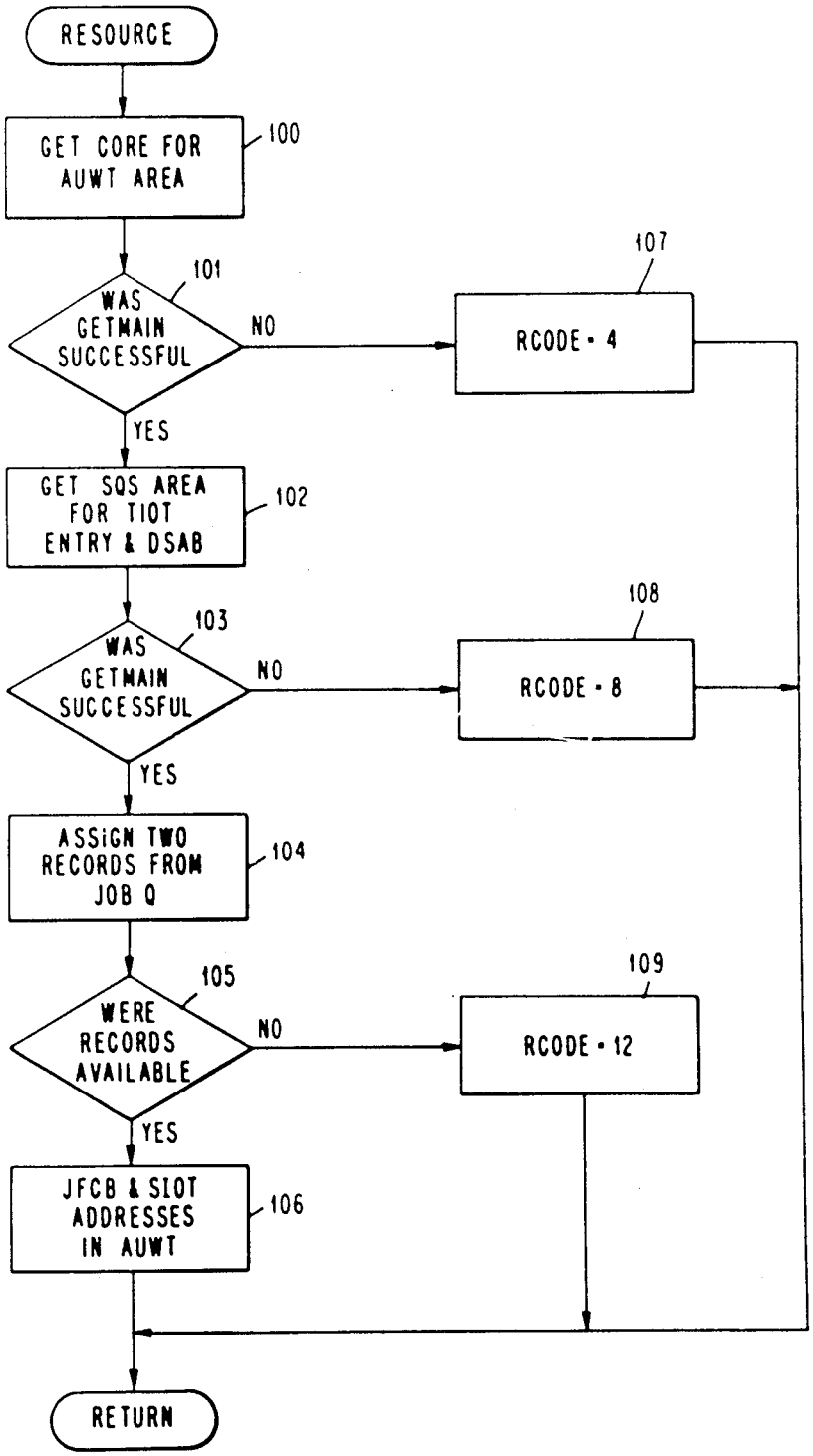
Figure 3C:
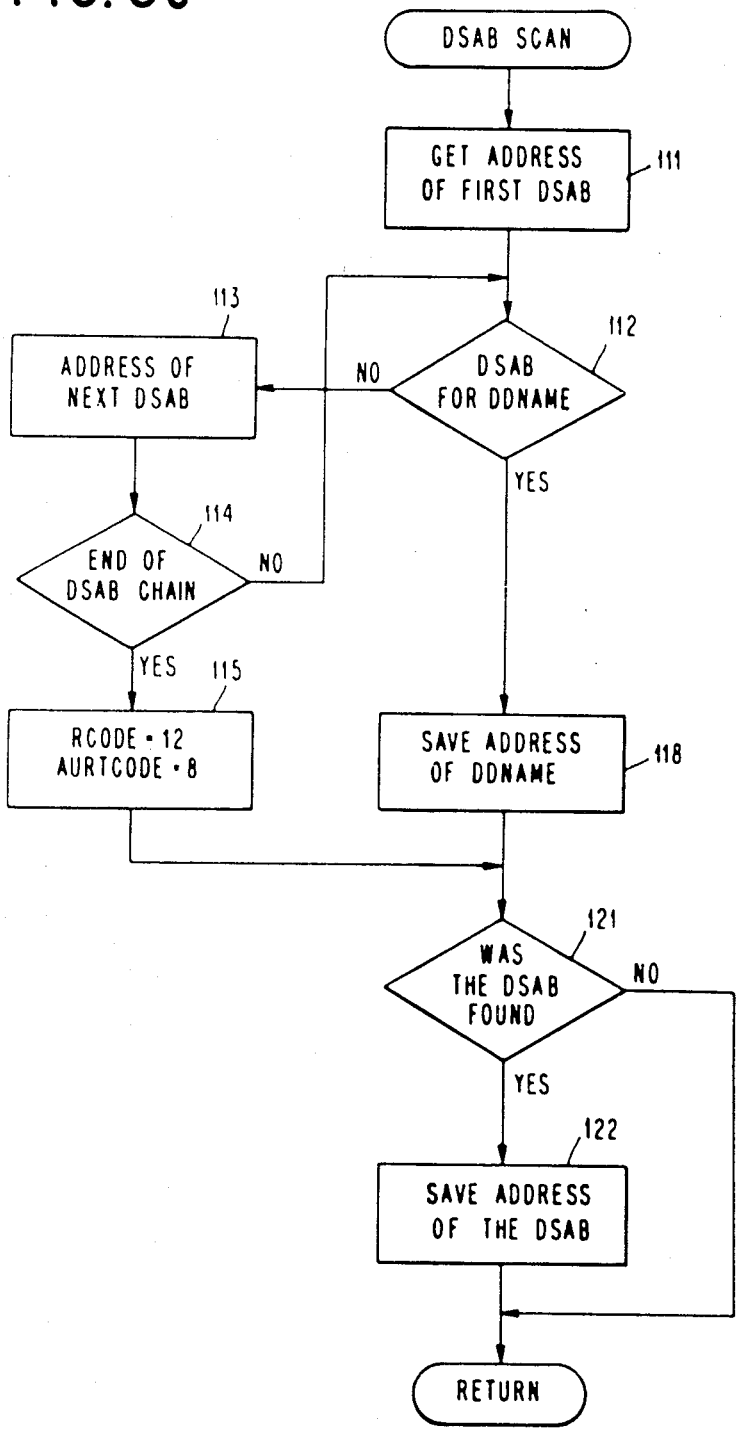
Figure 3D:
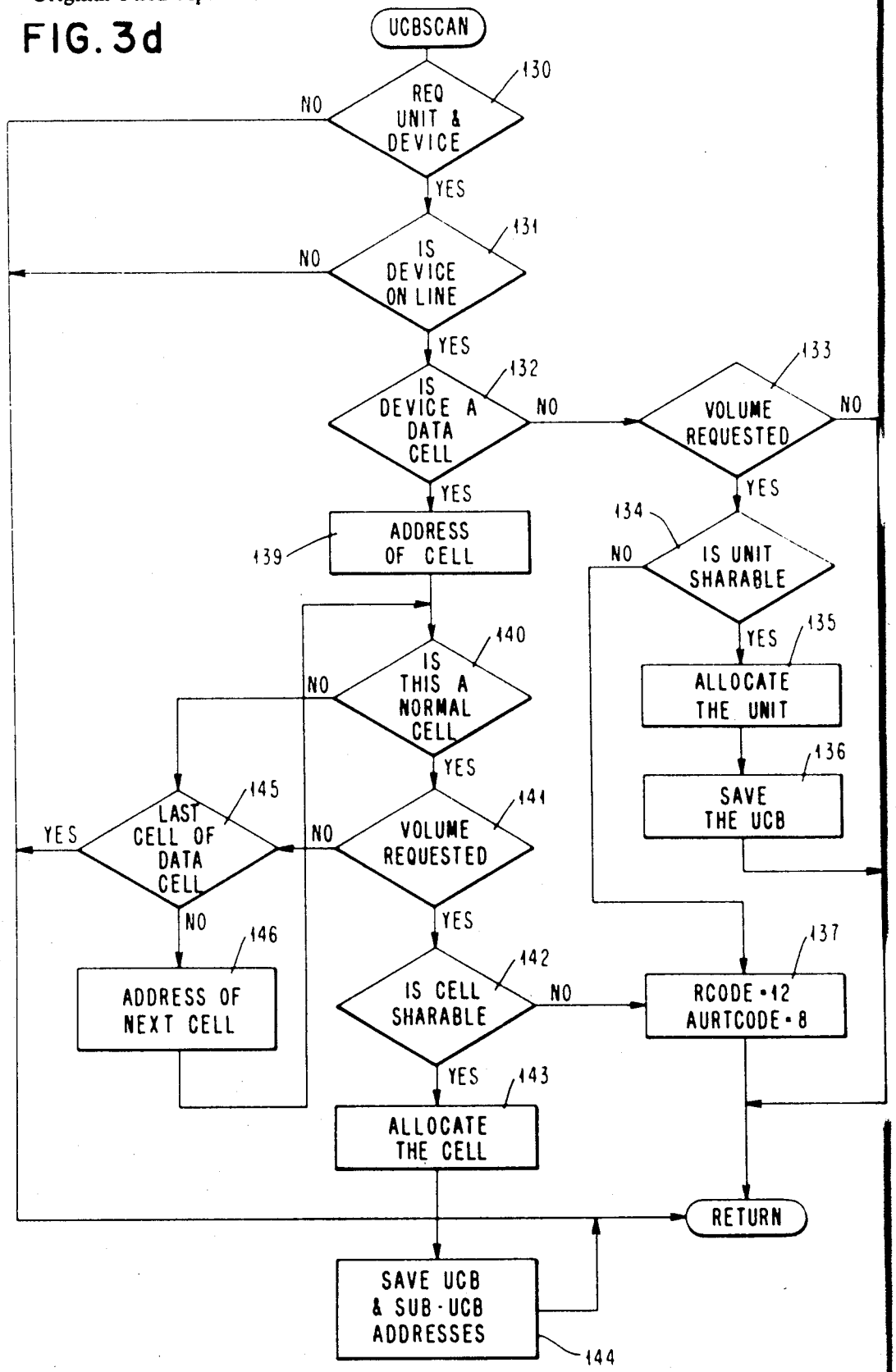
Figure 4A:
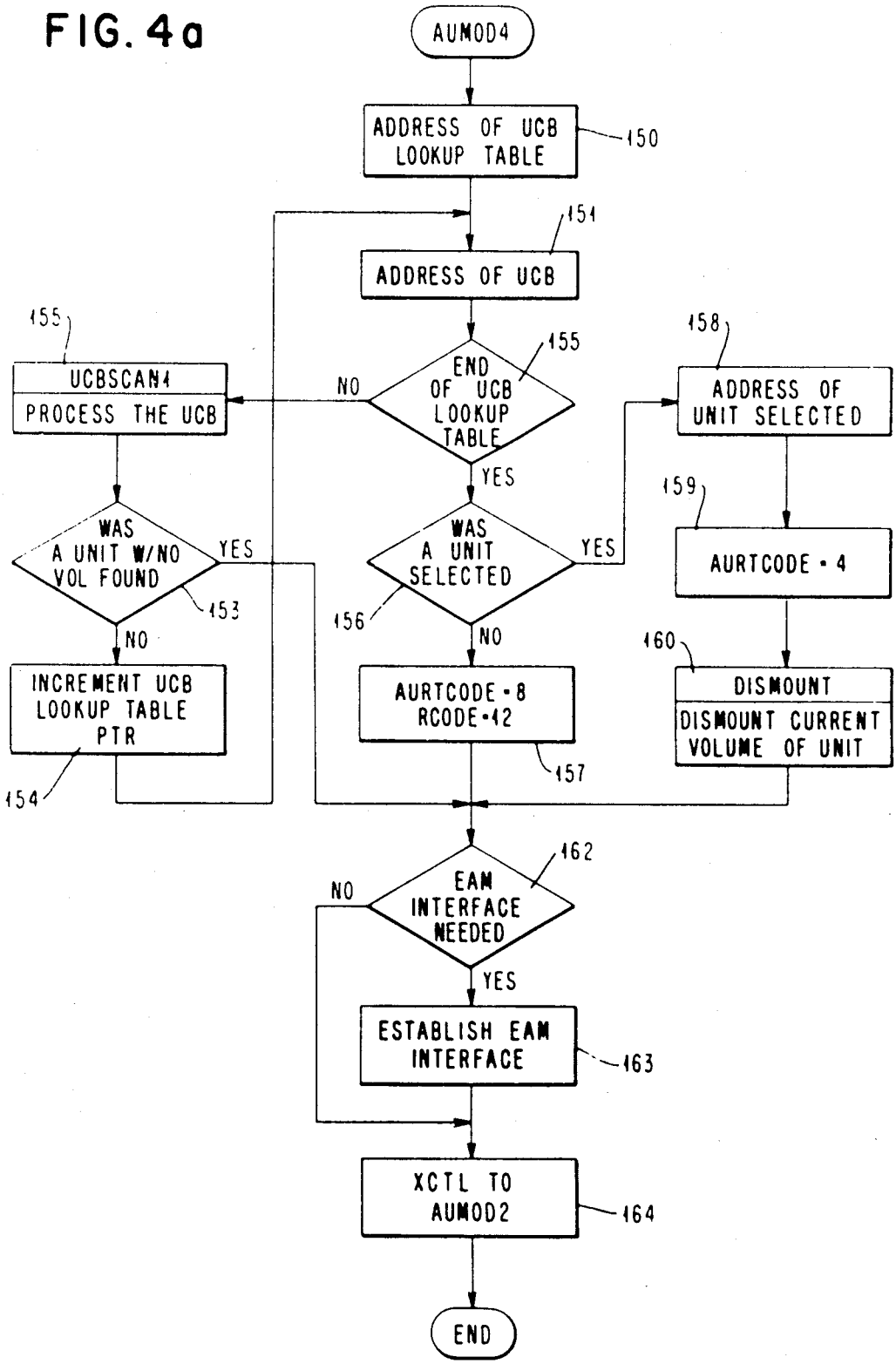
Figure 4B:
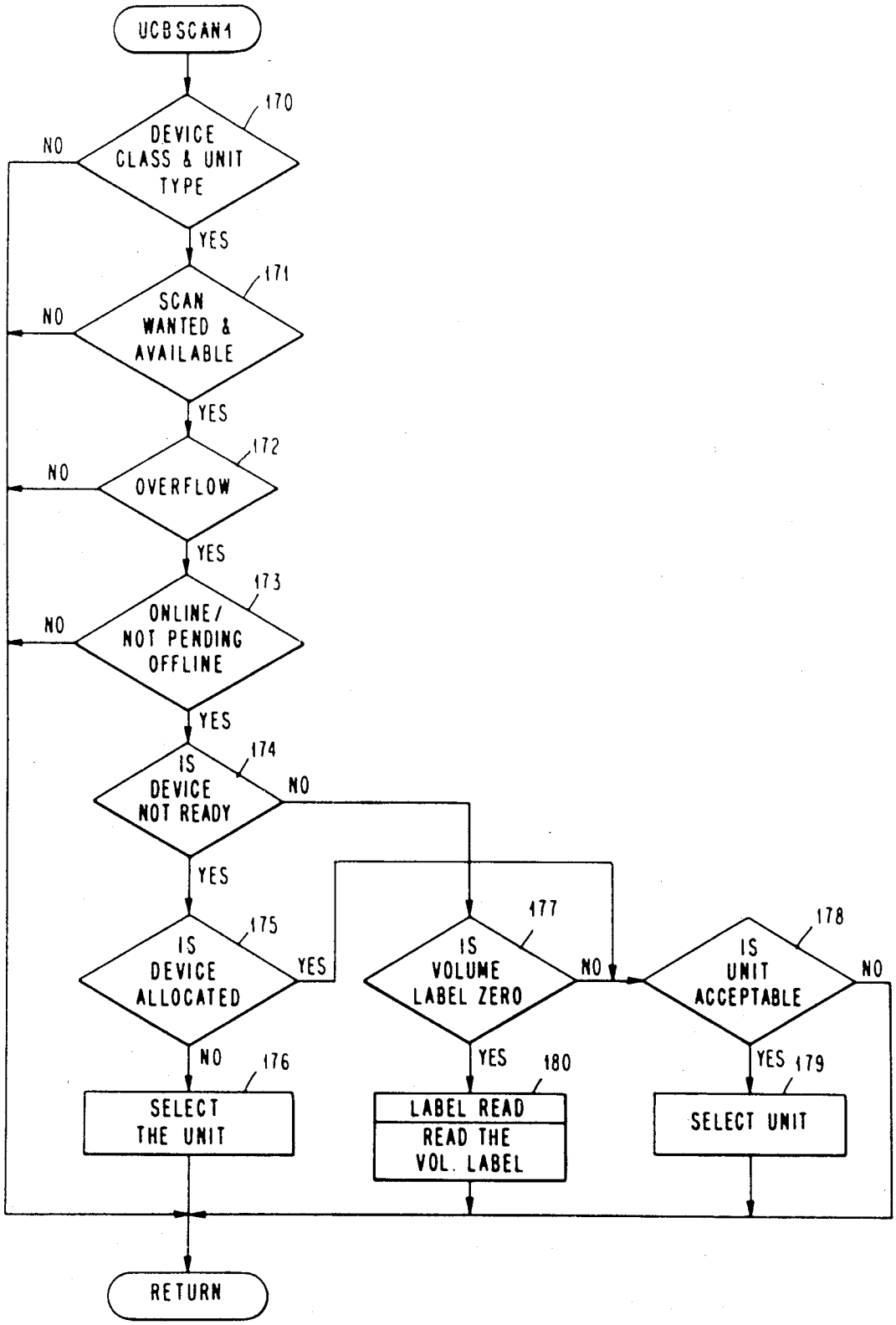
Figure 4C:
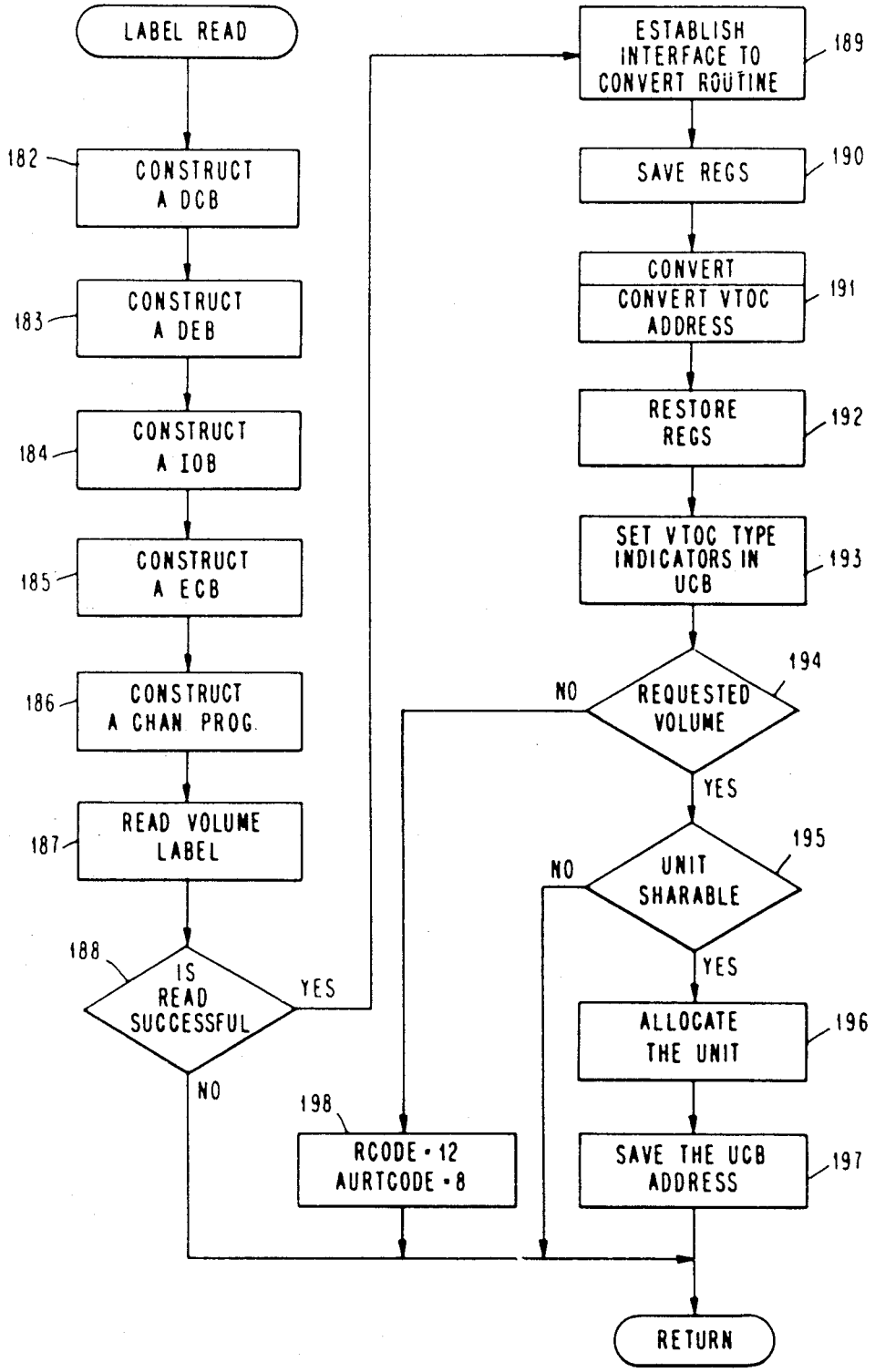
Figure 4D:
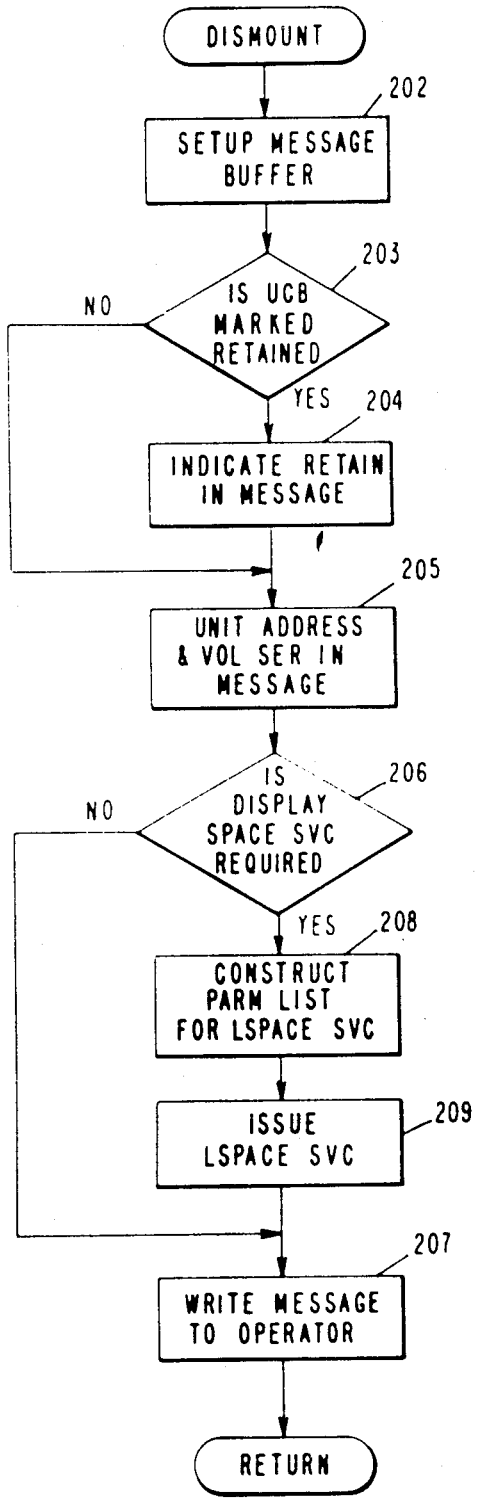
Figure 5A:
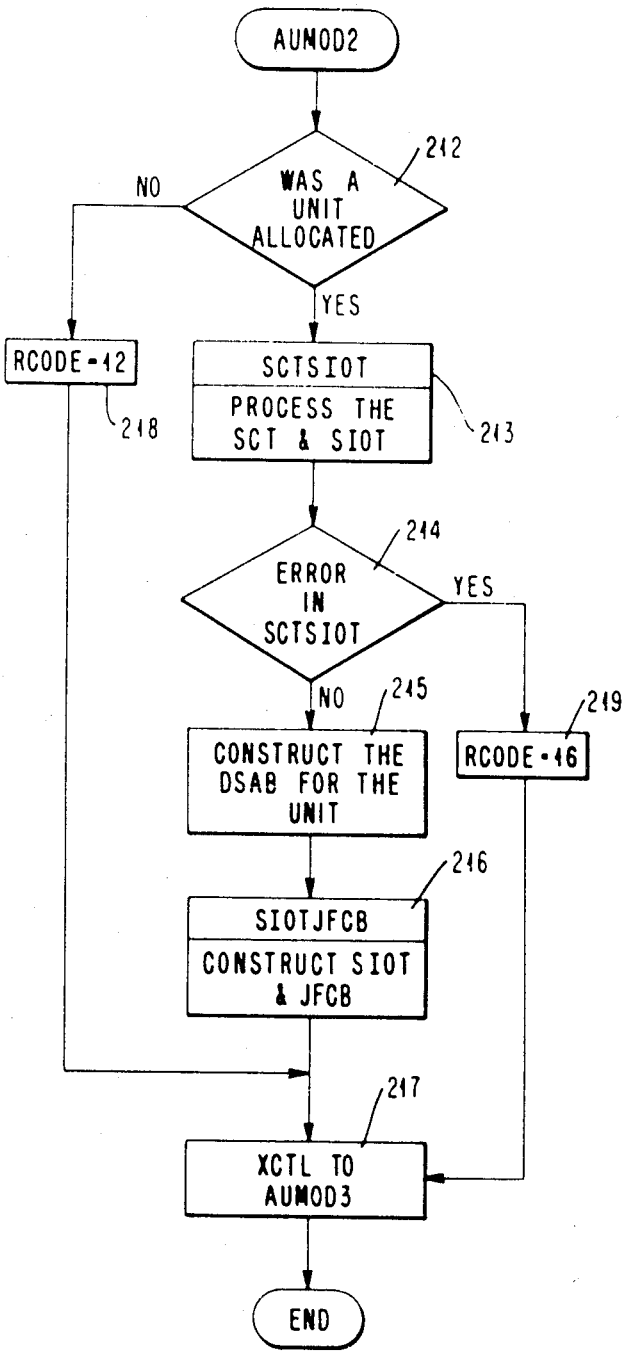
Figure 5B:
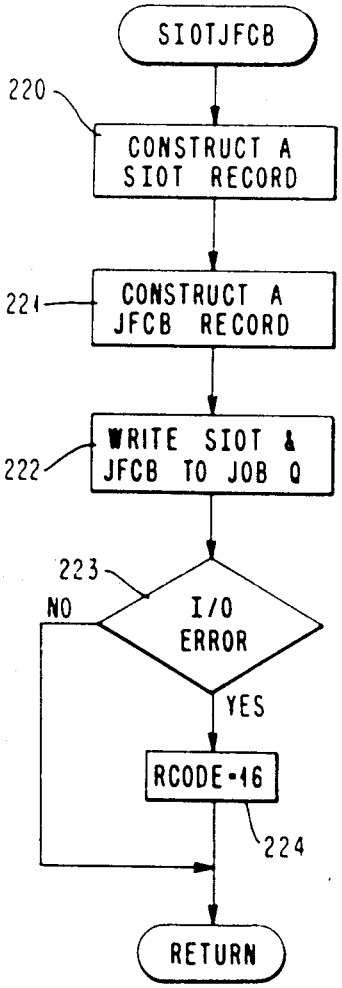
Figure 5C:
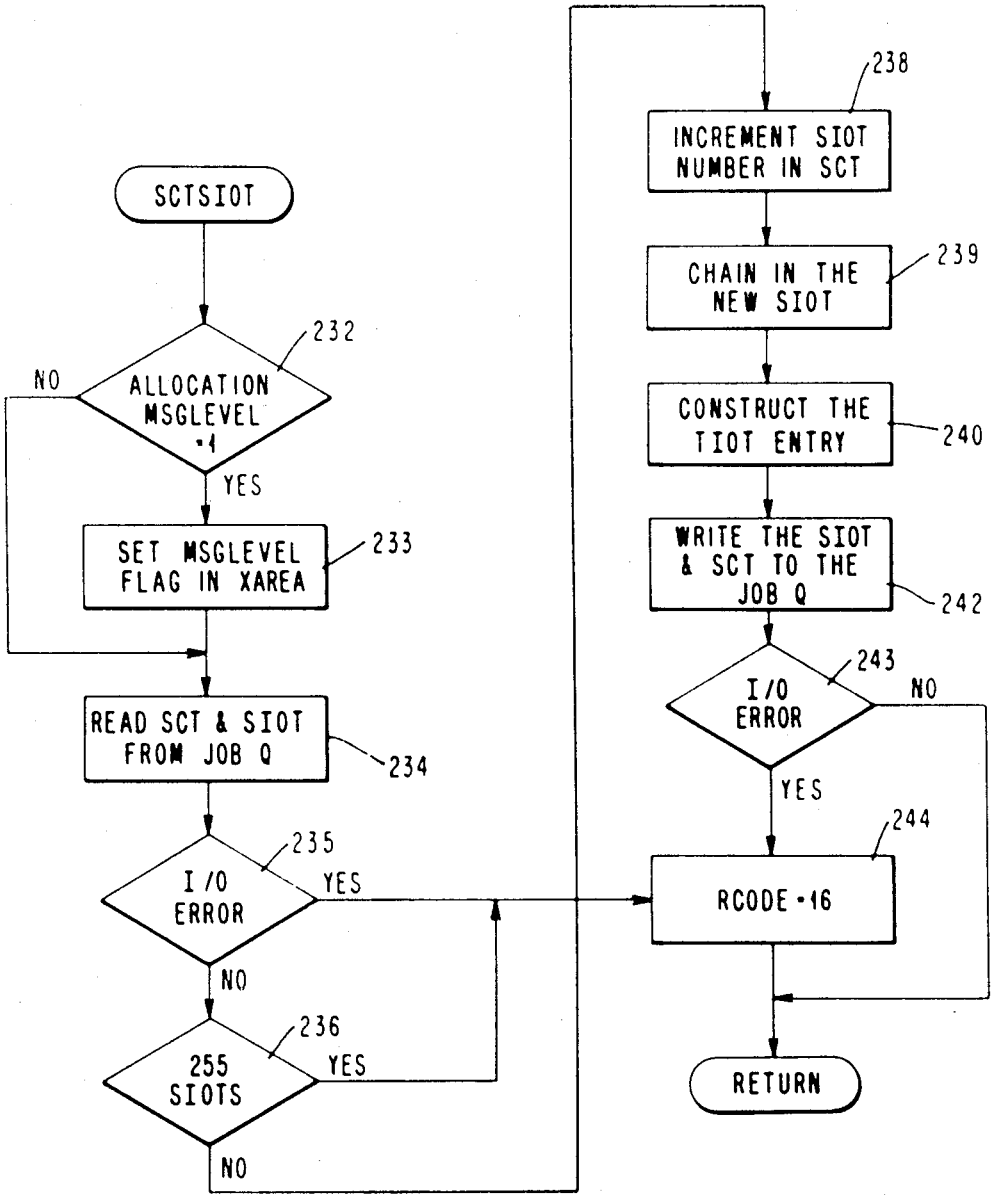
Figure 6A:
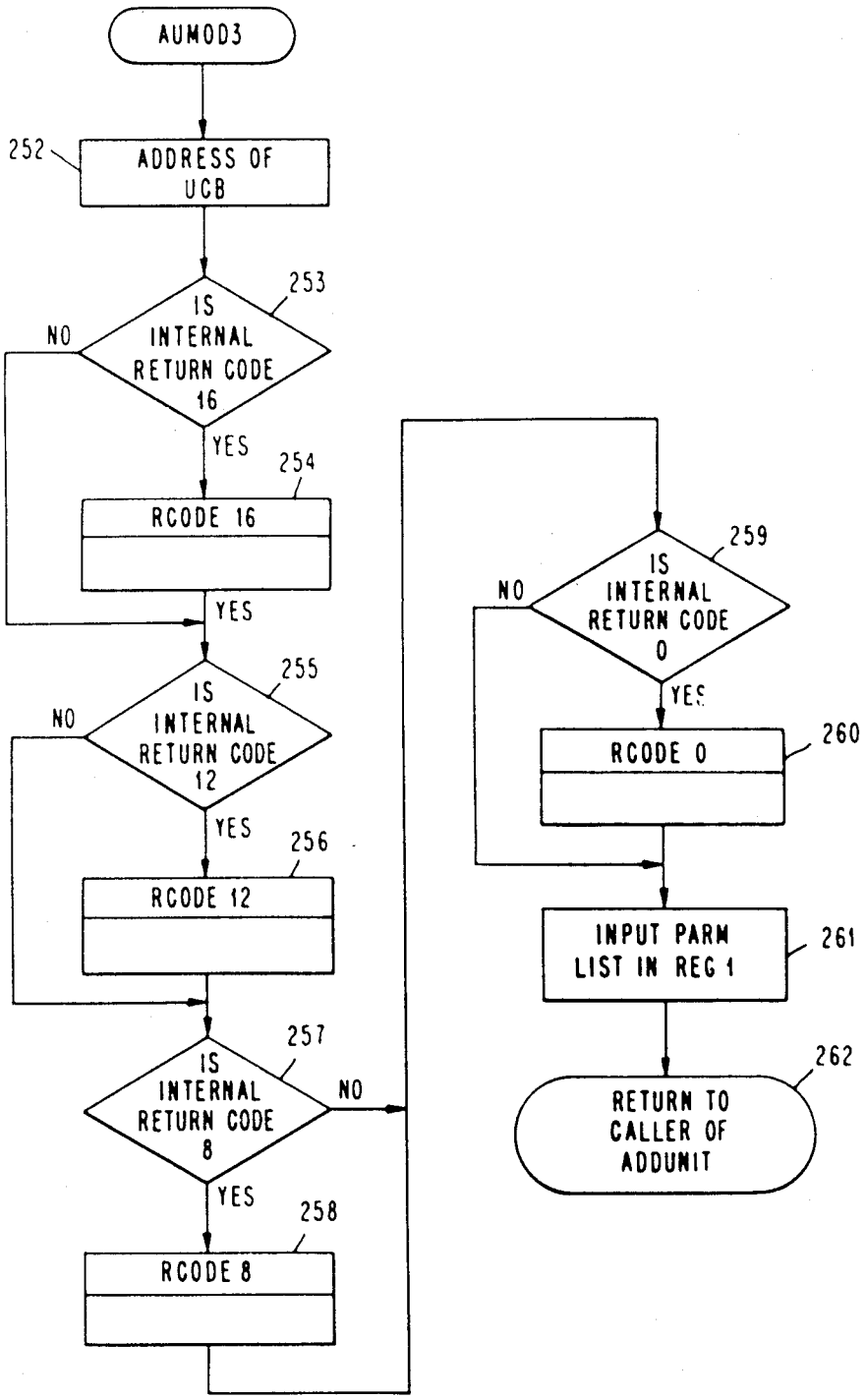
Figure 6B:
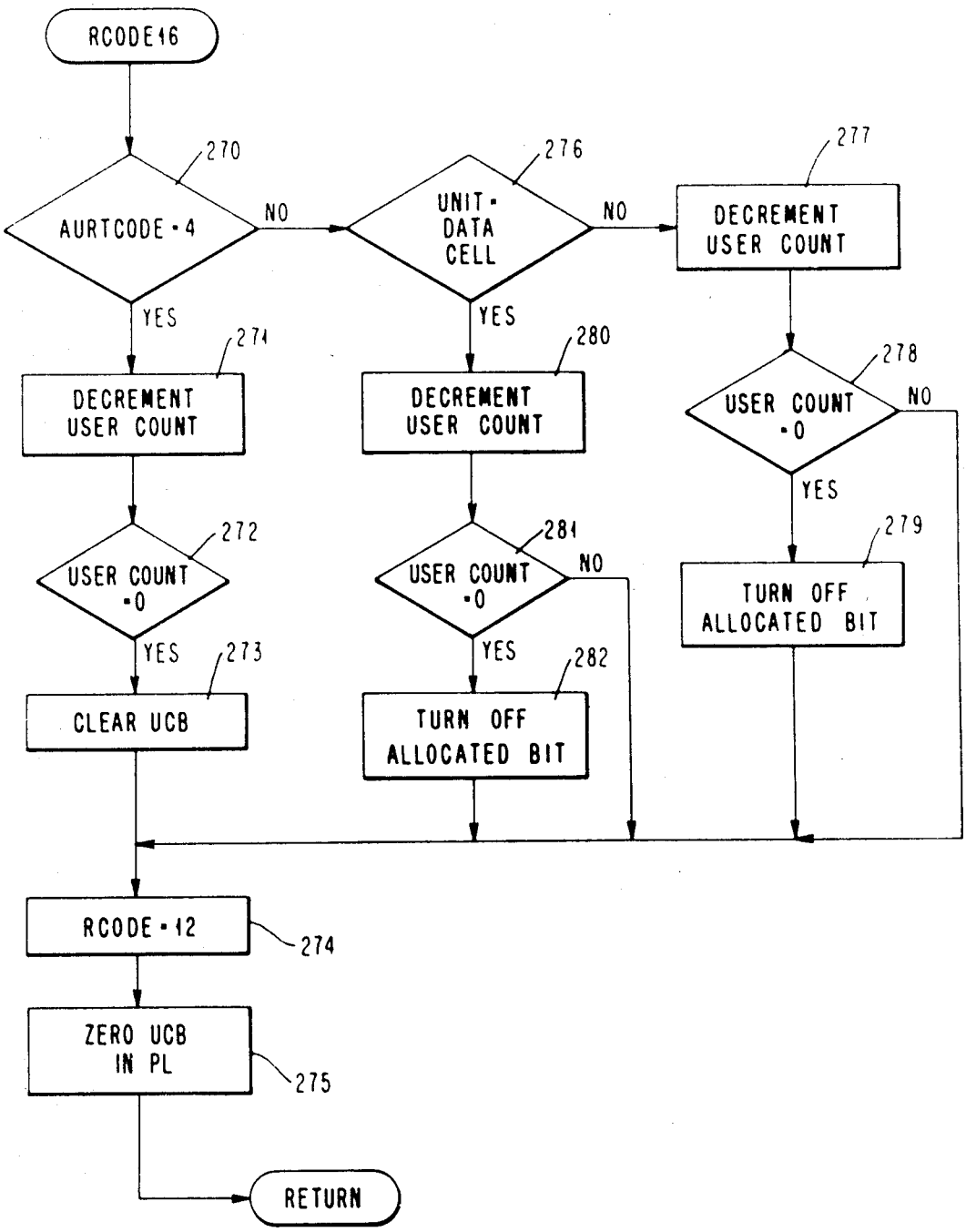
Figure 6C:
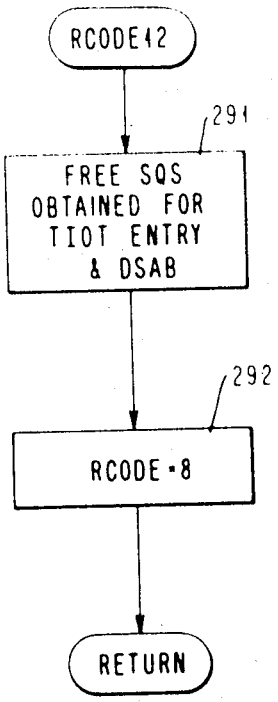
Figure 6D:
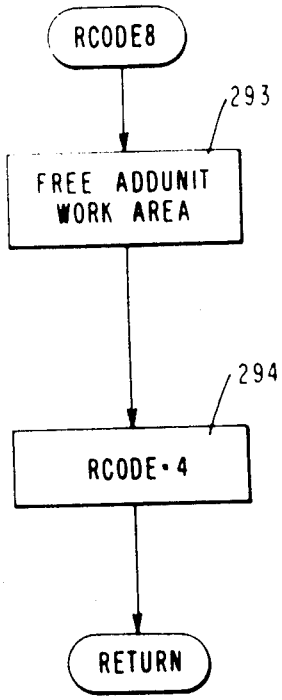
Figure 6E:
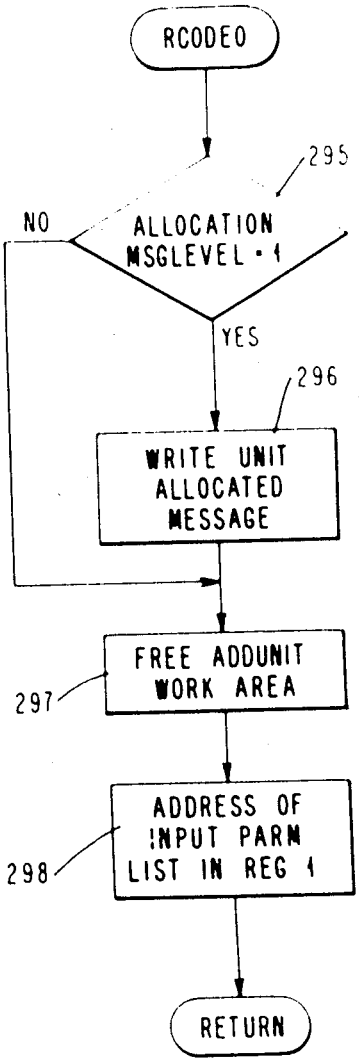

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 7, 1975

939 O.G. 10

T939,011

DYNAMIC EXTENSION OF ALLOCATION FOR NEW UNIT

Richard C. Mauceri, Poughkeepsie, and Robert J. St. Germaine and Eugene S. Schulze, Wappingers Falls, N.Y., assignors to International Business Machines Corporation, Armonk, N.Y.

Continuation of application Ser. No. 208,788, Dec. 16, 1971. This application Apr. 19, 1974, Ser. No. 462,271

**Int. Cl. G06f *13/00, 9/18***

U.S. Cl. 444—1

15 Sheets Drawing. 35 Pages Specification

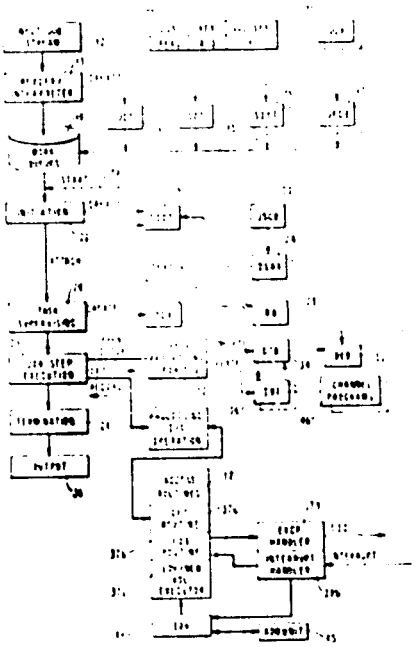

A data processing system includes a control program that, during operation thereof, dynamically extends the allocation to a new unit added after the initial allocation associated with a task or job step. This is accomplished by first specifying the volume and device type to be allocated and then by utilizing this information to find a new unit and change various pertinent control blocks and tables to reflect this changed status in such a manner that the processing of any required I/O operation on the new unit is accomplished by using the allocation output. A specific use of this process is also disclosed allowing one user in a data processing system to assess additional volumes associated with a data set that have been added to the system by a second user after the task of the first user has been initiated.